United States Patent [19]
Atchley et al.

[11] 3,750,878
[45] Aug. 7, 1973

[54] ELECTRICAL COMPONENT TESTING APPARATUS

[75] Inventors: Raymond D. Atchley; John B. Pegram, both of Los Angeles; Kenneth K. Dixon, Camarillo, all of Calif.

[73] Assignee: K. Dixon Corporation, Tarzana, Calif.

[22] Filed: Nov. 15, 1971

[21] Appl. No.: 198,580

[52] U.S. Cl..................... 209/73, 209/74 R, 209/75, 209/81, 209/90, 324/158 T, 214/1 BH
[51] Int. Cl.................................................. B07c
[58] Field of Search............... 209/81, 73, 74, 74 M, 209/75, 90; 198/38; 324/158 T; 214/1 BH

[56] References Cited
UNITED STATES PATENTS

| | | | |
|---|---|---|---|
| 3,539,004 | 11/1970 | Baker et al......................... | 209/81 R |
| 3,353,669 | 11/1967 | Broderick et al..................... | 209/73 |
| 3,384,236 | 5/1968 | Best et al........................... | 209/81 R |
| 3,616,942 | 11/1971 | Gruber............................... | 214/1 BH |

Primary Examiner—Allen N. Knowles
Attorney—George J. Netter et al.

[57] ABSTRACT

A quantity of generally rectangular chiplike devices, having electrodes on a pair of edges, are supplied to an unloading platform by a vibratory feeder. A cylindrical conveyor mounted adjacent the feeder includes on its outer periphery a set of vacuum conveying heads arranged at equal angles thereabout. The conveyor is indexed about its central axis in angular increments, bringing each conveyor head in succession into operative relation with a device at the loading station. As the conveyor head comes into proximity of a device at the loading station it is connected to a vacuum pump whereby the device is retained to move along the circular path. In another station farther along the path of movement of the conveyor an appropriately dimensioned set of electrical contact plates is arranged so that the device picked up by a preceding conveyor head is connected with the set of contact plates for accomplishing electrical test. As the conveyor indexes farther, mechanical memory elements shut off the supply of reduced air pressure to the conveyor heads, allowing the tested device to fall into a selected receptacle.

7 Claims, 11 Drawing Figures

PATENTED AUG 7 1973 3,750,878

RAYMOND D. ATCHLEY
JOHN B. PEGRAM
KENNETH K. DIXON
INVENTORS.

BY KENDRICK and SUBKOW
George J. Netter
ATTORNEYS

RAYMOND D. ATCHLEY
JOHN B. PEGRAM
KENNETH K. DIXON
INVENTORS.

BY KENDRICK and SUBKOW
George J. Netter
ATTORNEYS

ELECTRICAL COMPONENT TESTING APPARATUS

The present invention relates generally to the testing of electrical components, and, more particularly, to apparatus for the quantity testing of multi-electrode devices such as capacitors in a fully automatic manner and separating the tested devices into grades in accordance with the test performance.

BACKGROUND OF THE INVENTION

A wide variety of electronic and electrical devices are manufactured at the present time in the general form of a relatively small ceramic plate or chip having plated or coated connective electrodes on one or more of its edges. For example, many types of discrete component capacitors are constructed in this general form and the description of the subject invention will be given in connection with the testing of such capacitors.

As a final step in the manufacture of discrete component capacitors, they are requisitely tested for such things as ability to withstand rated voltage, leakage and the like. Testing difficulties have been compounded in recent years due to the continuing reduction in the size of capacitors as well as a concomitant reduction in price for the individual capacitors such that the relative proportion of testing cost is accordingly increased thereby. Therefore, it has become increasingly important to be able to perform electrical function tests on the capacitors in a substantially completely automatic manner and rapidly, with as little handling as possible.

Furthermore, these capacitors are constructed of a relatively thin, rectangular ceramic sheet, a pair of opposite edges of which are coated with a conductive liquid that on heat curing provides connective electrodes or terminals for the capacitor. Since in use a relatively permanent connection is made to the coated electrodes by soldering, for example, it is important that these electrodes not be impaired during testing. For that reason many of the conventional connection techniques cannot be used since they would expose the electrodes to excessive pressures or abrading forces that could degrade the electrodes, or even make them unsuitable for their intended use.

OBJECTS AND SUMMARY OF THE INVENTION

It is therefore a primary object and aim of the present invention to provide apparatus for automatically transporting and testing small-size, discrete component capacitors in an improved manner.

A further object of the invention is the provision of apparatus for transporting discrete component capacitors from a storage location along a definite path through one or more testing stations and depositing them into selected receptacles according to test grades.

Still another object of the invention is the provision of a carousel-like conveyor having a plurality of different conveyor heads, each of which carry a capacitor along a circular path through one or more testing stations and then past receptacles into one of which a capacitor is discharged in accordance with its test grade.

Another object is the provision of automatic electrical testing equipment in which temporary connection to the device being tested is accomplished without degrading the device electrodes.

Yet another objective is the provision of apparatus for electrically testing flat chip components while they are conveyed along a circular path in which a mechanical memory is utilized during test for discharging the components into selected receptacles according to test grade.

In accordance with the practice of this invention, a quantity of generally rectangular chiplike capacitors having electrodes on an opposite pair of edges are fed in a single line series to an unloading platform by a vibratory feeder. A cylindrical conveyor mounted adjacent the feeder includes on its outer periphery a set of vacuum conveying heads arranged at equal angles thereabout. The conveyor is indexed about its central axis in angular increments the same as that separating adjacent conveyor heads ringing each conveyor head in succession into operative relation with a capacitor at the loading station. As the conveyor head comes into proximity of a capacitor at the loading station, it is connected to a vacuum pump whereby the capacitor is retained as it moves along the circular path.

Specifically, as the circular conveyor is indexed, it also moves a predetermined amount vertically at the conclusion of the indexing circular motion. During this time the head which is in alignment with the loading platform is moved down and into contact with the capacitor. In another station farther along the path of movement of the conveyor an appropriately dimensioned set of electrical contact plates is arranged so that a capacitor picked up by a preceding conveyor head is connected with the set of contact plates during vertical movement of the conveyor. Associated electrical circuitry connected to the contact plates accomplishes the various tests desired.

Responsive to signals produced by the testing circuitry, certain ones of a plurality of memory actuator arms are set to actuation position corresponding to the test grade or results. As the conveyor is indexed farther, the so positioned actuator arms engage means for shutting off the supply of reduced air pressure to the conveyor heads allowing the tested capacitor to fall into a waiting receptacle. A plurality of such receptacles are provided corresponding to the number of different grades of test results desired, e.g., within accepted limits of rated breakdown voltage, without the limits of breakdown voltage.

As a final operation immediately prior to a conveyor head being indexed into registry with the loading platform, means are provided for removing a capacitor that may be still retained by the head and dropping it into a receptacle.

DESCRIPTION OF A PREFERRED EMBODIMENT

Figures 4, 5:
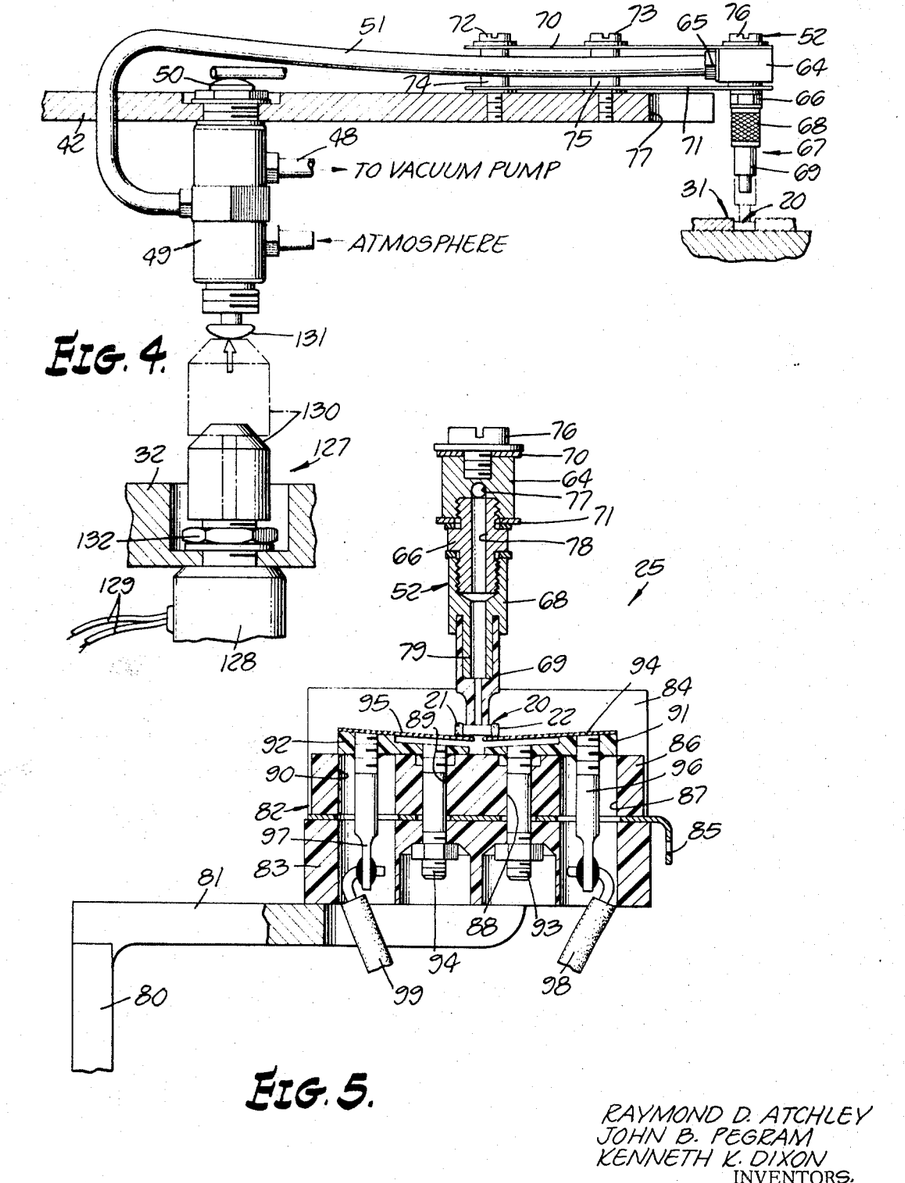
FIG. 4 is a further sectional view taken along the line 4—4 in FIG. 2 especially depicting a conveyor head.
FIG. 5 is a sectional view of the test station taken along the line 5—5 of FIG. 2.

The present invention is utilizable for testing a variety of different electrical and electronic elements, modules, integrated circuit devices or the like having external coated or plated terminal electrodes thereon. However, as specifically described herein, the apparatus of this invention is essentially contemplated for testing a discrete component capacitor 20 as shown in FIG. 5, which is of flat, generally rectangular shape, having a pair of its opposite edges provided with coated electrodes 21 and 22. A further description of the type of capacitor to which reference is made here and apparatus and technique for providing such electrodes thereon is to be found in the co-pending application Ser. No. 32,141, METHOD AND APPARATUS FOR PROVIDING CONDUCTIVE COATINGS by R. D. Atchley et al., filed Apr. 27, 1970, now U.S. Pat. No. 3,683,849. Such capacitors or capacitor chips comprise a ceramic outer body which encloses one or more sets of electrodic plates forming the capacitor and where the outside edges are dipped in a material to form a conductive coating terminal electrode on the edges in electrical contact with the enclosed electrodic coatings.

Figure 1:
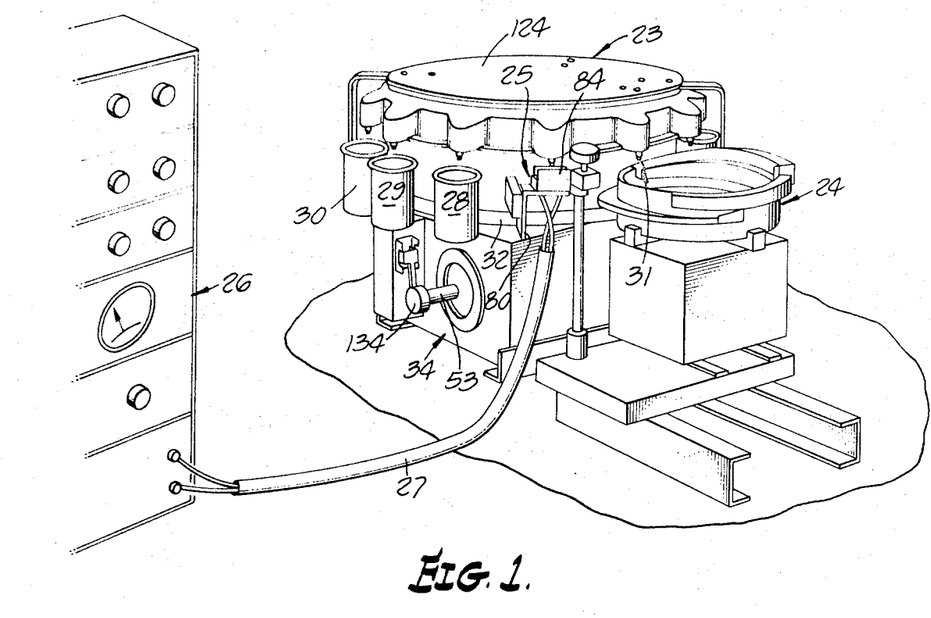
FIG. 1 is an overall perspective view of the testing apparatus of this invention and associated electrical circuitry therefor.

Turning now to FIG. 1 of the drawings, there is seen illustrated in perspective there, the testing apparatus including a conveyor 23 which carries capacitors to be tested from a vibrator feeder 24 and brings them into electrical contact with test probe means 25 interconnected with test circuitry 26 by a cable 27 to perform the desired electrical testing of the capacitors. After electrical testing, the capacitor is then moved along a path above a plurality of receptacles 28–30 into a select one of which each capacitor is dropped, dependent upon the grade of test, e.g., good, fair, unacceptable. More particularly, the apparatus 23 comprises a generally carousel type of conveyor which moves the capacitors picked up one at a time from the end of a line of such capacitors provided by the vibratory feeder and passes them through at least one electrical test station where it is determined whether the capacitors meet requisite electrical specifications, after which the capacitors are discharged into graded bins or receptacles corresponding to their respective test performance.

The vibrator feeder 24 is a known device that by the utilization of vibratory energy forms a continuous line of consecutively adjacent capacitors, the endmost being located at a loading station 31 for pickup by the conveyor. Capacitors to be tested may be bulk loaded into the feeder without concern for arrangement, the feeder automatically sorting and arranging the capacitors into proper loading relation. Since this is a commercially available item, no details will be provided as to construction or operation.

The test circuitry 26 can take a variety of different forms and a knowledge of its exact nature is not essential to an understanding of the present invention. This circuitry provides the capability for such things as electrically measuring the leakage across the capacitor, applying rated voltage across the capacitor to determine if it can withstand the potential stress or fails, or accomplish any other desired electrical test of the capacitor. Details of the test circuitry are accordingly not given.

Figure 2:
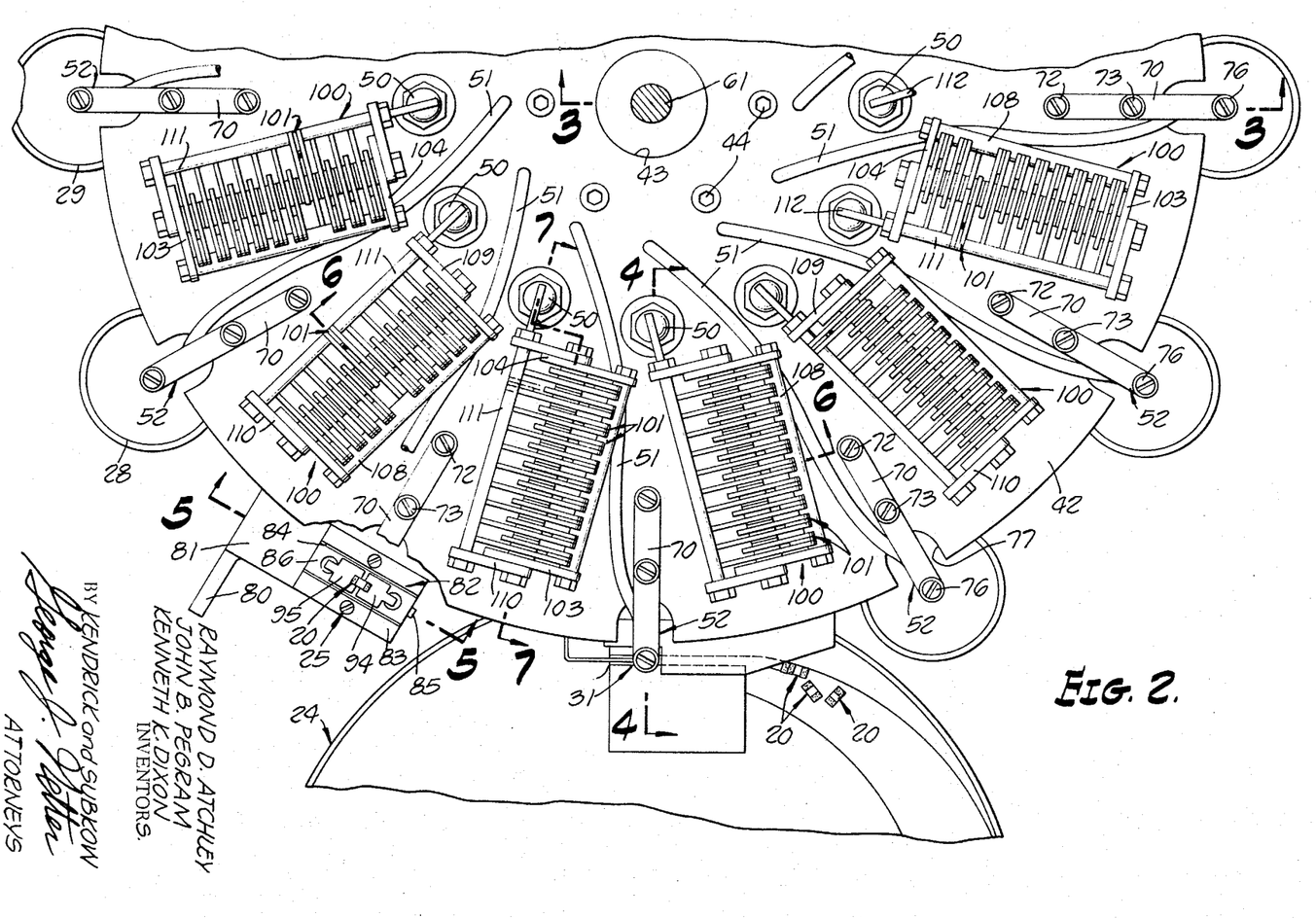
FIG. 2 is an enlarged, plan, partially fragmentary view of the apparatus of FIG. 1 shown with the covers removed.
Figure 3:
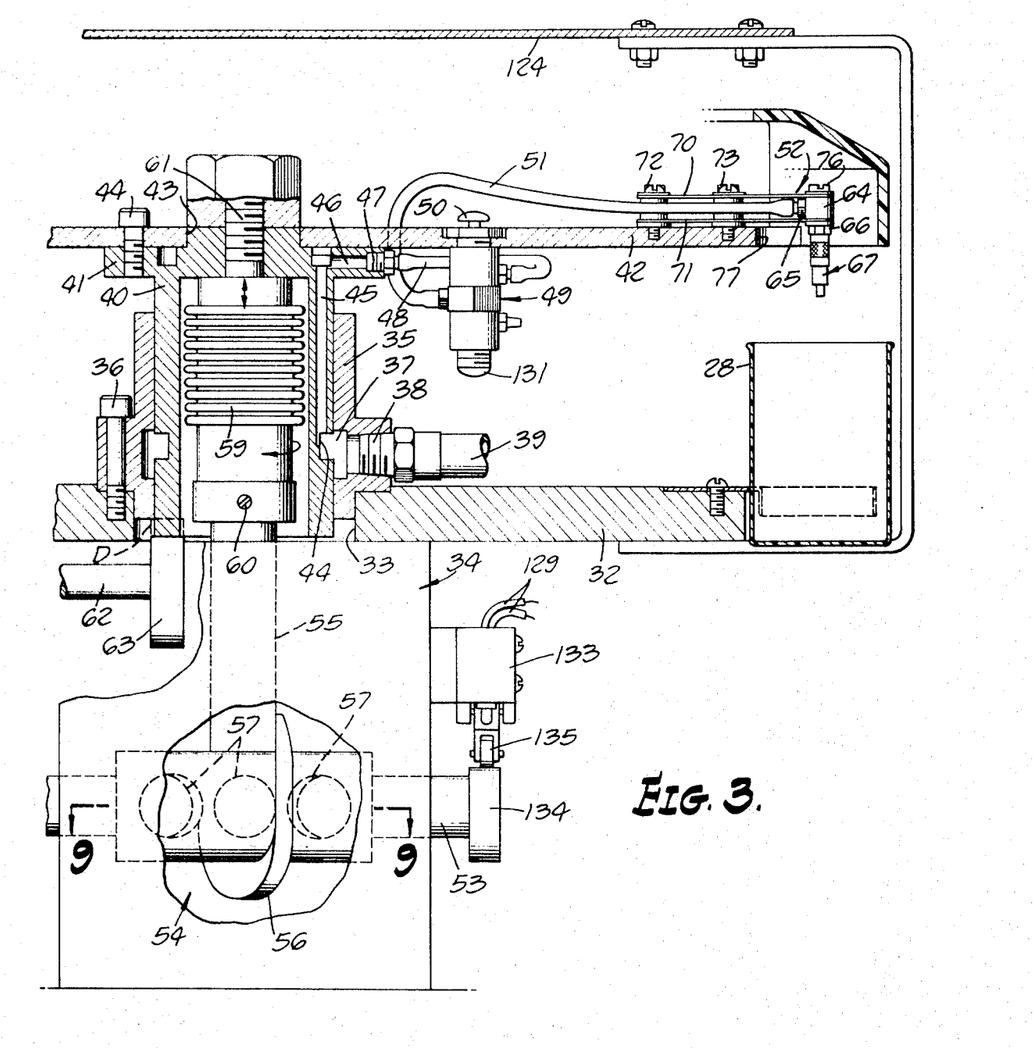
FIG. 3 is a sectional view of the apparatus of FIG. 2 taken along line 3—3.

Turning now simultaneously to FIGS. 2 and 3, the conveyor 23 is seen to include a generally circular base plate 32 having a centrally located opening 33. The base plate is fixedly mounted to the top side of a drive housing 34, supported on a suitable horizontal surface.

An open-ended cylindrical sleeve 35 is received within the base plate opening 33 and secured to the plate by threaded means 36 which pass through a hub on the sleeve. The internal sleeve surface has a continuous manifold slot 37 which communicates with the exterior via a threaded fitting 38. A hose 39 connects the fitting 38 and thus the manifold slot with a vacuum pump (not shown) for a purpose to be described.

A hollow sleeve 40 has an open end which is slidingly received within the upper end of sleeve 35 and a closed upper end with an enlarged hub 41. A circular conveyor plate 42 has an axial opening 43 that is received on a similarly dimensioned part at the upper end of sleeve 40. A threaded member 44 secures the plate 42 onto the sleeve hub 41.

The outer surface of the sleeve 40 has a continuous circumferentially extending undercut 44. The sleeve wall also includes a plurality of vertical passageways 45 and corresponding horizontal exit channels 46 connected therewith. When the sleeve 40 is in its lowermost position (FIG. 3), communication with the vacuum pump is provided through slot 37, undercut 44 and vertical passageways 45 to the exit channels 46.

Each exit channel 46 has a threaded fitting 47 via which a hose 48 is connected to a three-way valve 49. When the valve actuator 50 is in the upper position as shown in FIG. 3, a through communication is provided from hose 48 to hose 51 which, in turn, connects to a respective conveyor head 52 in a way and for a purpose to be described.

Figure 9:
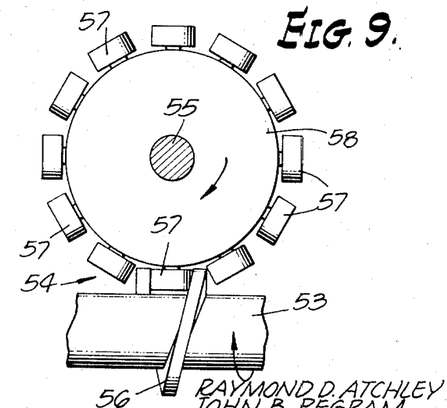
FIG. 9 is a plan, sectional depiction of the portion of the apparatus for producing an indexing rotation of the conveyor.

A horizontally disposed shaft 53 is rotated in the direction of the arrow (FIG. 3) by a power source not shown to drive an indexing means 54 which rotates the vertically extending shaft 55 in angular increments. As seen best in FIG. 9, the shaft 53 has an included worm gear 56 which meshes with roller elements 57 peripherally mounted on a circular drive plate 58 to which the vertical shaft 55 is axially secured. That is, rotation of the shaft 53 one revolution indexes the plate 58 and shaft 55 an angular amount corresponding to that between adjacent roller elements 57, namely 30°, when twelve conveyor heads are used.

A bellows spring 59 has its lower end affixed to the upper end of shaft 55 by a set screw 60 and its upper end secured against the inner end surface of the sleeve 40 by means of a threaded extension 61 received within an appropriately dimensioned opening. As is known to those skilled in the mechanical arts, a bellows spring is resilient longitudinally (arrow), but relatively rigid to torques applied about its cylindrical axis. Accordingly, by the linkage described in this and the immediately preceding paragraphs, one revolution of the shaft 53 produces an indexing rotation of shaft 55, bellows spring 59 and conveyor plate 42 of 30°. Moreover, since there are the same number of conveyor heads 52 as roller elements 57 and they are spaced at equal angles about the plate 42 axis, each indexing rotation advances the conveyor plate an amount corresponding to the angular distance between adjacent conveyor heads.

In addition to the rotative indexing, the conveyor plate and conveyor heads are subjected to an up and down movement, one cycle for each increment of indexing. More particularly, at the beginning of the indexing a shaft 62 is rotated in synchronism therewith, which drives an eccentric cam 63 against the lower edge of the sleeve 40. This imparts an upward movement to the sleeve 40, conveyor plate 42 and conveyor heads carried thereby a distance D shown in dash-line depiction. At the completion of a full revolution of the shaft 62 and cam 63, the driven sleeve and conveyor plate are returned to the lower position as in FIG. 3.

It is to be noted that even at the extreme upper limit of travel of the sleeve 40, the slots 37 still communicates with the undercut 44. Accordingly, irrespective of the vertical position of the sleeve 40 during cycling by the cam 63, the vacuum pump is maintained in full communication with each of the valves 42.

Turning now additionally to FIG. 4, each conveyor head 52 is seen to include a header 64 having a first fitting 65 to which is suitably connected the hose 51 that communicates through the valve 49 to a vacuum pump when the valve actuator 50 is in its upper position. A second fitting 66, at substantially 90° to the first fitting 65 has a nozzle means 67 received thereon. The nozzle means includes a ferrule 68 that is threadedly received on a portion of the fitting 66 and a hollow, cylindrical, tubular means 69 having an open lower end. The header 64 includes internal passages interconnecting the fitting 65 with the fitting 66 and thus to the interior of the tubular means 69.

A pair of elongated blade-like spring supports 70 and 71 are held in a parallel spaced condition by a pair of screws 72 and 73, passing through openings in the blade members and spacers 74 and 75. The ends of the screws 72 and 73 are received in the upper surface of conveyor plate 42 at such a location that the outer ends of the blade members 70 and 71 extend slightly beyond the peripheral edge of the plate. A screw 76 passes through the blade spring support 70 securing the support to the header 64. The fitting 66 affixes the support 71 to the lower spring support end. In accordance with this construction the conveyor head 52 is mounted at the end of a resilient, double-beam cantilever, such that motion of the nozzle portion 67 is confined to a substantially vertical direction. The dash-line depiction illustrates movement of the nozzle portion from its upper to its lower extremity.

FIG. 5 shows in sectional view the details of the header and nozzle portions of FIG. 4, described in the immediately preceding paragraph. Thus, as shown there, the header 64 includes a generally solid body member having an internal passageway 77 which connects with both the fitting 65 and a similar passageway 78 in the fitting 66. The fitting 66 is threaded at both ends, one for receipt in the header 64 and the other for receipt within a similarly threaded port of the ferrule 68. The tubular means 69 which may be constructed of plastic, is press fit upon an extension 79 of the ferrule which also includes an internal axially aligned channel communication with a similar channel in the ferrule.

In operation the conveyor head is connected via the valve 49 to the vacuum pump which establishes a low pressure condition at the lower orifice of the tubular means 69. In this way a capacitor or other chip element brought into contact with the lower end of the tubular means will be retained thereto by air pressure.

As to operation of the conveyor head 52 in picking up a capacitor from the vibrator feeder 24, it is assumed the capacitor is arranged in a generally flat, horizontal condition in the loading station 31 as shown in FIG. 4. As a conveyor head 52 moves into the loading station by the indexing rotation of the conveyor, it is at first raised to the upper or solid line position shown at FIG. 4 and then, when it is precisely located above the capacitor 20, the cap 63 lowers the plate 42 which moves the means 69 to the dotted line position, bringing the lower end thereof into contact with the upper flat surface of the capacitor 20. Accordingly, the low pressure provided by the vacuum pump holds the capacitor against the lower end of the means 69 throughout subsequent conveying.

The test station 25 is where the capacitors are temporarily electrically connected through the cable 27 to test circuitry 26 and is shown in enlarged sectional view in FIG. 5. As illustrated there, a mounting bracket 80 includes a generally horizontal portion 81 on the upper surface of which is mounted a test contacting means 82 by any suitable means. More particularly, the contacting means 82 has an insulative mounting block 83 onto which is received a U-shaped metal shield 84 having a ground connection terminal 85. Within the channel of the shield 84 there is provided an enlongated insulative block 86 having four openings 87, 88, 89 and 90 extending therethrough and which are in registry with similar openings in the block 83 and the bottom of the shield. A pair of insulative supports 91 and 92 are secured to the upper surface of the block 86 and the block 83 in an integral manner by screws 93 and 94. The upper surface of supports 91 and 92 are canted such that spring metal contact plates 94 and 95, mounted respectively thereon, extend toward one another at an angle below horizontal. The outer end of each contact plate is affixed to the supports 91 and 92 by terminal means 96 and 97, respectively. The plates 94 and 95 are thus cantilever mounted with their inner ends spaced from one another and free to move vertically, impeded only by the inherent resiliency of the material.

In use, a capacitor to be tested is conveyed into the test station 25 in the manner described where it is located precisely above the space between the inner ends of the contact plates 94 and 95. When the conveyor head carrying the capacitor is cammed to its lowermost condition, the electrodes 21 and 22 are brought into respective contact with the contact plates 95 and 94, with a slight wiping action produced due to the resiliency of the contact plate material. At this time an electrical circuit is not completed through the capacitor via the wires 98 and 99 of the cable 27 to the test circuitry 26 for accomplishing predetermined tests. Signals are then generated by the circuitry 26 corresponding to the grade of the capacitor. For example, if leakage testing is being accomplished, the grades may be merely "acceptable" and "non-acceptable" with signals being generated corresponding to each.

Figure 11:
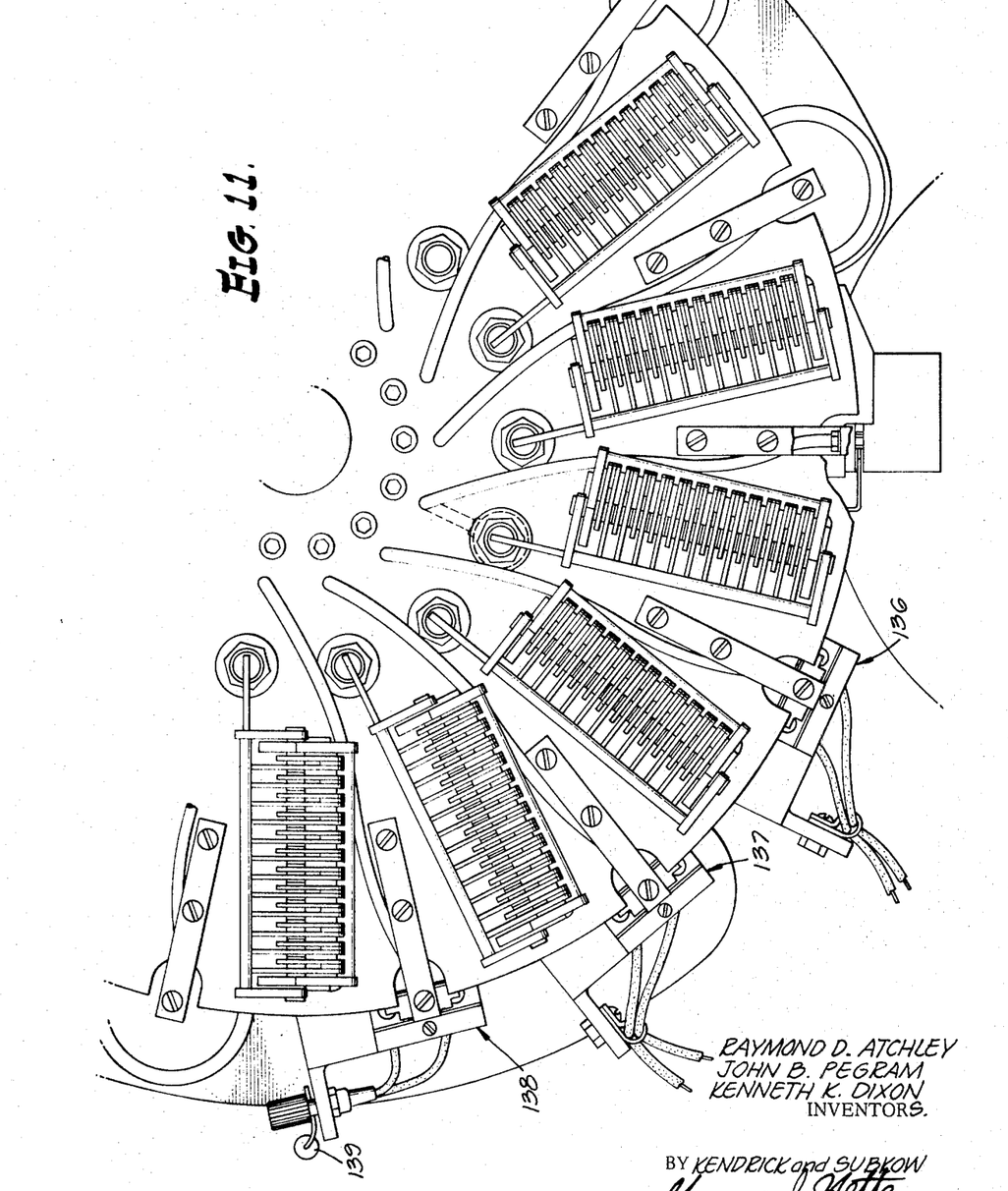
FIG. 11 is a plan, partially fragmentary view similar to that of the FIG. 10 embodiment.

As has already been alluded to generally, a capacitor after test is discharged into a correct one of the receptacles 28–30 and this is accomplished by programming the memory apparatus 100 associated with the conveyor head carrying the tested capacitor to discharge the capacitor in the correct receptacle when it moves therepast. Referring to FIGS. 2, 6, 7 and 11, the memory apparatus 100 is seen to include a plurality of memory elements 101 pivotally mounted onto a shaft 102 that is end mounted between a pair of stanchions 103 and 104 on the upper surface of the conveyor plate 42. As illustrated in FIGS. 2 and 11, the memory apparatus for each conveyor head is located just behind the memory head referencing along the path of indexing movement.

Each memory element 101 is constructed of a pair of flat bladelike elements which are assembled together with a pair of ends skewed to provide a generally V-shaped end portion 105. The arms 106 and 107 of the V-shaped portion are not only separated when viewing into its flat dimension as in FIG. 6, but also are separated through the thickness of the memory element as shown in FIG. 7 by the distance $a$.

Figure 6:
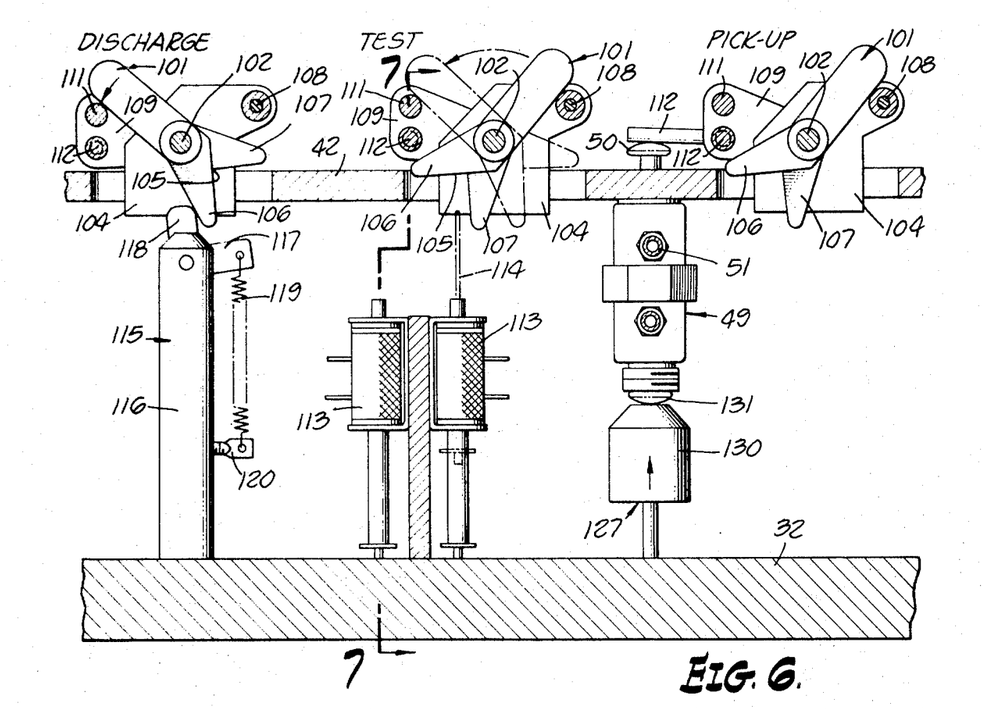
FIG. 6 is a sectional view taken through the memory section along the line 6—6 in FIG. 2.
Figure 7:
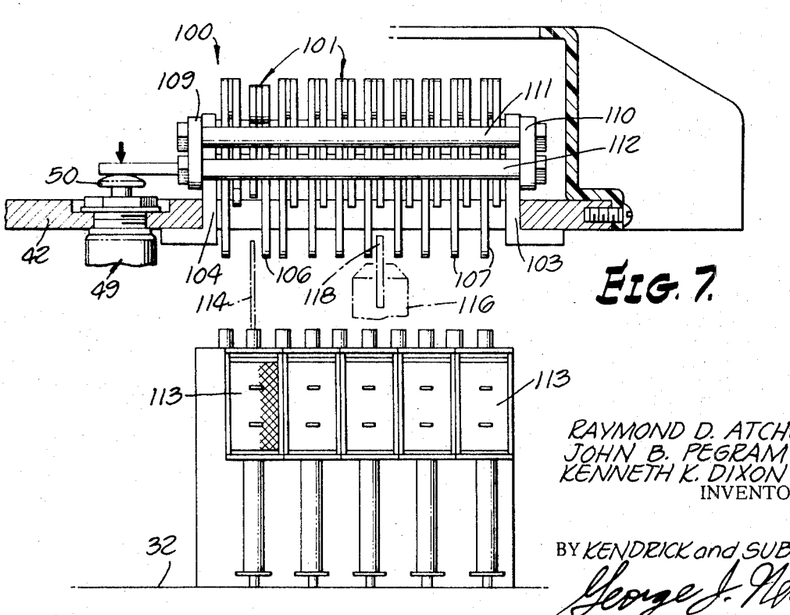
FIG. 7 is an elevational view of the memory section of FIG. 6, taken along line 7—7.

As can be seen best on comparing FIGS. 6 and 11, rod 108 is provided on each set of memory apparatus 100 running lengthwise of the unit and having its ends fixedly secured to the stanchions 103 and 104. A pair of pivot plates 109 and 110 each have an end pivotally connected to the stanchions 103 and 104 and further include a pair of vertically spaced rods 111 and 112 which extend generally parallel to the rods 102 and 108 and at the same side of memory apparatus.

The memory elements 101 are each pivotable from a PICK-UP position as shown at the right in FIG. 6 where the upper end thereof rests on the rod 108 and the lower arm 107 extends generally vertically downward, to a DISCHARGE position as shown at the left in FIG. 6 in which the upper end is braced against the rod 111 and the arm 106 extends generally vertically downward. Initially, that is during and before pick-up of a capacitor, the memory elements are all resting in the same position, namely that shown at the extreme right in FIG. 6.

In each test station there are provided a plurality of solenoids 113, one for each memory element in the memory apparatus, mounted on the base plate 32 and arranged in a line generally parallel to that of the memory apparatus long dimension. More particularly, the solenoids 113 are so arranged that on energization, each extends an armature 114 upwardly into obstructing relation (FIG. 6) to the arm 106 of an associated one of the memory elements 101. In this manner, as seen best in FIG. 6, as a conveyor head carrying a capacitor that has finished electrical test moves out of the test station, the armatures 114 of each of the solenoids 113 that have been energized as a result of the test engage the arms 107 of an associated memory element, pivoting that memory element in a counter-clockwise direction as viewed there so that the upper part of the memory element now rests on the rod 110. Of course, those memory elements that have not been so actuated remain in the position identified as PICK-UP. In view of the relative proximity of the memory elements composing the memory apparatus, it may be necessary to mount the solenoids 113 in two parallel rows staggered with respect to each other to obtain the necessary number of armatures positioned in the correct lateral spacing. This aspect of the invention can be more fully appreciated on a comparative view of FIGS. 6 and 7.

After the capacitor leaves the test station and the appropriate memory elements have been transferred to the DISCHARGE position, the signal is removed from the solenoids 113 which allows the armatures to return to their lowermost position and await further energization according to the test results on the next ensuing capacitor.

Each of the discharge stations which are located immediately above a receptacle 28–30 is provided with a discharge initiating means 115. Specifically, the element 115 includes a generally vertically extending rod 116 mounted on the base 32, the upper end of which includes an L-shaped rocker 117 pivotally connected therewith. A camming arm 118 of the rocker 117 extends vertically from the end of the rod 116, whereas the other portion of the means 117 is connected to a spring 119, the other end of which is anchored as at 120. Each initiating means is so located that the camming arm 118 is disposed in the path of the memory element associated for discharge in that particular station. Thus, as shown in FIG. 6, when the memory element 101 has been transferred to the DISCHARGE position, the camming portion 118 now engages the arm 106 thereof forcing the upper end of the memory element downwardly against the rod 111 causing the plates 109 and 110 to rotate counter-clockwise as viewed in FIG. 6 and as shown in FIG. 7 drives the end of the rod 112 into contact with the valve actuator 50 transferring the valve from one of connection to the vacuum pump to a connection with normal air pressure. When this happens the conveyor head 52 carrying the capacitor loses its vacuum at the back side of the capacitor, thereby causing the capacitor to drop into the receptacle.

Summarizing operation to this point, a capacitor is picked up in the loading station by a vacuum conveyor head, indexed along a circular path and brought into contact with test probe means in a test station on an up and down motion of the conveyor accomplished at the end of each indexing increment. During this contact, the capacitor is tested and an appropriate solenoid is actuated in accordance with the test results to transfer an associated memory element from pick-up to discharge position. As the conveyor is further advanced, the tested capacitor is released into the receptacle corresponding to the test results by interaction of the transferred memory element and initiating means 115 which releases the vacuum on the conveyor head, thereby releasing the capacitor.

Figure 8:
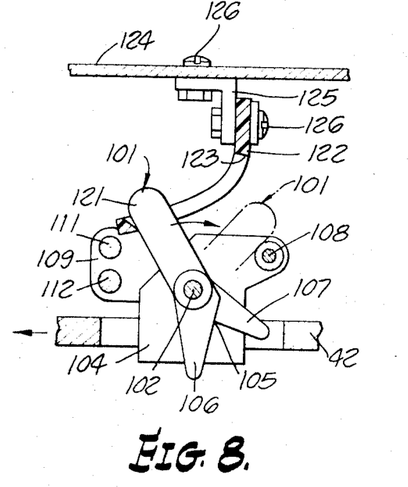
FIG. 8 is an enlarged sectional view of one of the memory elements shown immediately prior to being reset.

As each conveyor head approaches the loading station 31, the part 121 of the memory element 101 engages a resetting means 122 which transfers the memory element from the position where the arm 121 rests on rod 111 to that shown in phantom line where it is in contact with the rod 108. Specifically, the means 122 comprises an elongated sheetlike member having an opening 123 therein of sufficient width to receive all of the arms 121 of each memory as they move therepast, with the lower wall defining the opening transferring the memory arms (FIG. 8). The means 122 is constructed of a flexible material such that a memory element, after being transferred to a position contacting the rod 108 on further rotation of the conveyor deflects the means 122 out of obstructing relation. The upper end of means 122 is secured to the lower surface of the cover 124 by a suitable means such as angle bracket 125 and threaded member 126. Accordingly, the memory elements are all reset and in condition to be loaded with a capacitor as previously described.

It will be recalled that each of the three-way valves 49 associated with a conveyor head 52 had been switched to the no-vacuum condition at the time of discharging a capacitor 20 into the proper graded receptacle. The three-way valve remains in this condition as it precesses around the conveyor until its associated conveyor head enters the loading station 31. Referring now simultaneously to FIGS. 4 and 6, means 127 are mounted to the base plate 32 immediately adjacent the loading station for actuating each three-way valve to tthe vacuum condition when its associated conveyor head is at the bottom of its downward stroke in the loading station engaging a capacitor.

The means 127 includes a solenoid coil 128 which, upon being energized by lead wires 129, drives an armature 130 upwardly to the position shown in phantom line. The armature near the uppermost limits of its travel engages the lower end 131 of the valve actuator 50 and on completion of the armature upward movement the actuator is translated upwardly a sufficient amount to transfer the three-way valve to the vacuum condition. The solenoid coil is affixed to the base plate 32 by a conventional threaded member 132 as seen best in FIG. 4.

Energization of the resetting solenoid coils 128 for setting the three-way valves to vacuum in the loading station is provided by a switch 133 (FIG. 3) which interconnects the lead wires 129 and 128 with a source of electrical power (not shown). An eccentric cam 134 mounted at the end of shaft 53 drives a cam follower 135 and effects closure of the switch 133 once for each revolution of the shaft 53. By proper location of the switch 133 relative to the eccentric cam, the timing is such that the solenoid coil is energized precisely at the time the conveyor head is moving downwardly and is closely adjacent its lowermost position in the loading station. This is important in that if the vacuum is applied too soon, the vacuum can cause the chiplike members to move in the loading station and may disrupt proper conveyance thereof.

Figure 10:
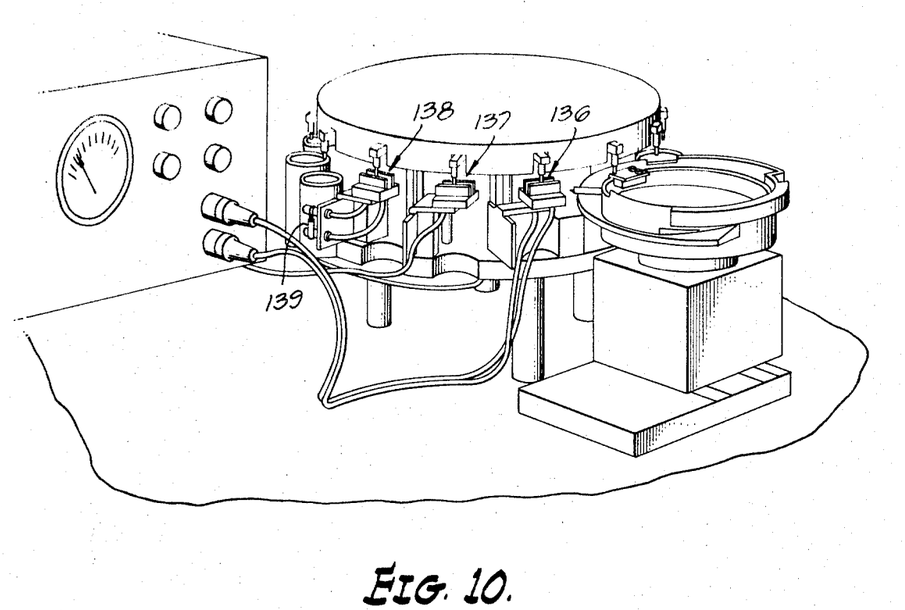
FIG. 10 shows a further embodiment of the invention having a plurality of test stations.

As a further form of the invention, reference is now made to FIG. 10 wherein a plurality of electrical test stations 136, 137 and 138 are provided. More particularly, stations 136 and 137 are provided for accomplishing separate electrical tests, whereas the station 138 is utilized to electrically discharge the capacitor before dropping it into a receptacle. That is, although structurally each of the stations 136–138 are identical, the station 138, as shown best in FIG. 11, has a load resistor 139 connected across the contact terminals and via which the capacitor charge is unloaded. The purpose of this discharging step is to prevent possible impairment of the capacitors that might occur if they were dropped into a receptacle with other charged capacitors. In other respects this embodiment of the invention is the same in that the same memory apparatus and loading and discharging apparatus is used as that previously described in the FIG. 1 embodiment.

What is claimed is:

1. In test apparatus for capacitors having a pair of spaced external terminals, a plurality of said capacitors being provided one at a time at a loading station, a conveyor having a plurality of separate conveyor heads for picking up said capacitors at said loading station and conveying them along a definite path through a test station and subsequently through a plurality of discharge stations, the improvement comprising:
    separate mechanical memory means carried by said conveyor, one such means for each conveyor head, having a plurality of memory elements rotatably mounted on said conveyor;
    each said memory element having first and second angularly spaced arms, said memory element being rotatable from a first position where said first arm is extended and said second arm is withdrawn and a second position where said second arm is extended and said first arm is withdrawn;
    means mounted in said test station selectively actuatable to engage an extended memory element first arm, rotating said engaged memory element to the second position extending the second arm thereof; and
    means located in each discharge station actuated by respectively different extended memory element second arms for releasing the capacitor from its conveyor head and resetting said memory element to the first position.

2. In apparatus as in claim 1, in which said selectively actuatable means in said test station includes a plurality of solenoids, each solenoid having an armature that on energization of the associated solenoid is moving into obstructing relation with a memory element first arm as it is moved through said test station thereby rotating said memory element to the second position.

3. Apparatus for electrically testing and sorting according to test results a plurality of chiplike capacitors having a pair of conductive electrodes provided on opposite edges thereof, comprising:
    a conveyor frame mounted for rotative indexing movement about a generally vertical axis;
    a plurality of conveyor head means, each such means having vacuum retention parts;
    individual spring blade support means mounting each conveyor head means to the conveyor frame such that the vacuum retention parts extend downwardly from the frame;
    separate valve means interconnecting each conveyor head means with a vacuum pump, said valve means being selectively controllable to connect and disconnect the respective head means with said pump;
    means for locating the capacitors at a pick-up point in registry with and below the vacuum retention parts of the conveyor heads at end of one of the indexing movements;
    means for moving the conveyor head means vertically down and up at the conclusion of an indexing movement an amount sufficient to bring the vacuum parts of the conveyor head means at the pick-up point into operative contact with the capacitor located at said pick-up point;
    means located beyond the pick-up point along the path of indexing rotation brought into electrical contact with electrodes of capacitors carried by the conveyor head means during vertical movement of said conveyor head means for accomplishing electrical test thereof; and
    means for controlling said valve means to disconnect the head means from the vacuum pump after electrical test thereby discharging the tested capacitor from the conveyor head means.

4. Apparatus for electrically testing and sorting according to test results of generally rectangular capacitors each having a pair of coated connection terminals on opposite edges, comprising:

a carousel-type conveyor mounted for rotative movement in a generally horizontal plane and limited vertical motion;

a plurality of vacuum retention heads mounted on said conveyor at equal angles about the axis of rotation, said heads having parts extending downwardly of said conveyor;

a plurality of leaf spring means each having one end affixed to the conveyor and the other end secured to one vacuum retention head thereby providing a resilient cantilever mounting for said retention heads;

separate selectively actuatable valve means for interconnecting each vacuum retention head with a low pressure air reservoir or with normal room air pressure;

means for locating the capacitors one at a time at a loading station along the indexing path of movement;

contact means located farther along the indexing path from said loading station interconnected with electrical test equipment;

means for cyclically moving the vacuum retention heads into operative contact with the capacitors in said loading station and the capacitors carried by said retention heads into contact with said contact means; and means carried by said conveyor and cooperating with certain of a plurality of means located along the path of indexing movement beyond said contact means for actuating the associated valve means to interconnection with normal room air pressure for releasing the capacitor retained thereby.

5. Apparatus for testing a plurality of chiplike electrical devices having external terminal electrodes arranged one at a time at a loading station, comprising:

a circular conveyor frame mounted for movement about its axis in a generally horizontal plane;

a plurality of vacuum conveyor heads, each having vacuum retention parts;

spring blade support means cantilever mounting each conveyor head to said conveyor frame;

means for rotatively indexing the conveyor frame and vacuum heads carried thereby predetermined angular amounts, the loading station being located below the marginal edge of said frame and in registry with a conveyor head at the conclusion of an indexing movement;

contact means located under the frame marginal edge in registry with a conveyor head at the conclusion of an indexing movement beyond the loading station, said contact means being interconnected with testing circuitry; and means for providing a down and up motion to the conveyor frame generally vertically of said frame at the conclusion of each indexing rotation whereby the vacuum retention parts of a first conveyor head are brought into contact with a device in the loading station thereby retaining it, and a second conveyor head moving a retained device into contact with said contact means.

6. Apparatus as in claim 5, in which there are further provided separate valve means interconnected with each vacuum conveyor head, said valve means being controlled by signals from said test circuitry for releasing the vacuum on said conveyor head to release the retained device.

7. Apparatus as in claim 5, in which said contact means includes a pair of resilient contact plates cantilever mounted in edge opposed slightly spaced relation with the plates generally horizontal such that as a chiplike electrical device is moved vertically with respect to the conveyor frame one device electrode contacts one of said plates and another device electrode contacts another of said plates.

* * * * *